(12) United States Patent
Onda et al.

(10) Patent No.: US 9,140,941 B2
(45) Date of Patent: Sep. 22, 2015

(54) IN-PLANE SWITCHING MODE LIQUID CRYSTAL DISPLAY DEVICE

(71) Applicant: NLT Technologies, Ltd., Kawasaki, Kanagawa (JP)

(72) Inventors: Shinya Onda, Kawasaki (JP); Hidenori Ikeno, Kawasaki (JP)

(73) Assignee: NLT TECHNOLOGIES, LTD., Kanagawa (JP)

( * ) Notice: Subject to any disclaimer, the term of this patent is extended or adjusted under 35 U.S.C. 154(b) by 0 days.

(21) Appl. No.: 14/048,453

(22) Filed: Oct. 8, 2013

(65) Prior Publication Data
US 2014/0104522 A1    Apr. 17, 2014

(30) Foreign Application Priority Data
Oct. 15, 2012  (JP) ................. 2012-228487

(51) Int. Cl.
| | |
|---|---|
| G02F 1/1333 | (2006.01) |
| G02F 1/1343 | (2006.01) |
| G02F 1/1337 | (2006.01) |
| G02F 1/137 | (2006.01) |
| G09G 3/36 | (2006.01) |

(52) U.S. Cl.
CPC *G02F 1/134363* (2013.01); *G02F 2001/13712* (2013.01); *G02F 2001/133749* (2013.01); *G02F 2001/134372* (2013.01); *G02F 2001/134381* (2013.01); *G09G 3/3655* (2013.01); *G09G 2300/0434* (2013.01)

(58) Field of Classification Search
CPC .......................................... G02F 2001/134381
USPC ........................................................ 349/141
See application file for complete search history.

(56) References Cited

U.S. PATENT DOCUMENTS

| | | | |
|---|---|---|---|
| 2001/0010575 A1* | 8/2001 | Yoshida et al. ............... | 349/141 |
| 2009/0046232 A1* | 2/2009 | Matsuyama et al. .......... | 349/139 |
| 2012/0249941 A1* | 10/2012 | Yamamoto et al. .......... | 349/123 |

FOREIGN PATENT DOCUMENTS

| | | |
|---|---|---|
| JP | 2000-356786 A | 12/2000 |
| JP | 2001-091974 A | 4/2001 |

* cited by examiner

*Primary Examiner* — Thanh-Nhan P Nguyen
(74) *Attorney, Agent, or Firm* — Sughrue Mion, PLLC

(57) ABSTRACT

A liquid crystal display device according to the present invention is directed at optimizing the viewing angle characteristics of black luminance in a diagonal direction by realizing a low tilt angle without depending on an oriented film or an orientation treatment method in an FFS mode. The liquid crystal display device of the present invention is a liquid crystal display device in the FFS mode, including: a liquid crystal layer having a negative dielectric anisotropy; a color filter substrate disposed to sandwich the liquid crystal layer; and a TFT substrate having pixels, wherein a CF side common electrode which controls a potential is present in a liquid crystal layer side of the color filter substrate; and there is electric field controlling means which forms an alternating electric field between the CF side common electrode and a TFT side common electrode.

8 Claims, 18 Drawing Sheets

IN-PLANE SWITCHING MODE LIQUID CRYSTAL DISPLAY DEVICE

BACKGROUND OF THE INVENTION

1. Field of the Invention

The present invention relates to a liquid crystal display device, which is particularly improved in viewing angle characteristics on a tilt angle in fringing field switching (FFS) and has wide viewing angle characteristics.

2. Description of the Related Art

Liquid crystal display devices have been used in various displays for computers, televisions, and the like because of having excellent characteristics of a small thickness, a light weight, and a low power consumption.

There are various operation modes of the liquid crystal display panels of the liquid crystal display devices. Examples of such operation modes are: a TN (Twisted Nematic) mode in which liquid crystal molecules between two glass substrates are twisted and oriented; an IPS (In-Plane Switching) mode in which an electric field is transversely applied by a pair of two electrodes formed on one glass substrate to rotate liquid crystal molecules; an FFS (Fringing field switching) mode in which the alignment of liquid crystal molecules is controlled by a fringe electric field between common and pixel electrodes formed to be laminated on one glass substrate; and the like. In each of the operation modes of the liquid crystal display panels, the quantity of light passing through a liquid crystal display panel is changed to display by making light from a backlight incident on the liquid crystal display panel and by controlling the alignment of liquid crystal molecules by a voltage.

FIG. 1 is a cross-sectional view that illustrates the structure of a liquid crystal display panel 519 in the FFS mode. The liquid crystal display panel 519 in FIG. 1 is composed of: a TFT substrate 502 and a color filter substrate 504 which are affixed to each other at a kept certain distance; and a liquid crystal layer 505 sandwiched between the two substrates (1999 SID International Symposium Digest of Technical Papers, "A Novel Wide-Viewing-angle Technology: Ultra-Trans View", (p. 202) (Non Patent Literature 1)).

The TFT substrate 502 is composed of: a thin film transistor and various wirings which are not illustrated; two transparent electrodes 510 and 511 which are laminated to sandwich an insulating film 513 and include ITO and the like; and an oriented film 518 which includes polyimide and the like and is subjected to orientation treatment, on a glass substrate 501. The transparent electrode 511 disposed in a side closer to the liquid crystal layer 505 in the two transparent electrodes 510 and 511 is provided with openings to control the alignment of liquid crystal molecules 517 in the liquid crystal layer 505 by a fringe electric field 525 generated between the two transparent electrodes.

In contrast, in the color filter substrate 504 affixed to the TFT substrate 502, a black matrix which is not illustrated and a color resist which is not illustrated are formed on a glass substrate 501, an overcoat which covers the black matrix and the color resist and is not illustrated is laminated, and an oriented film 518 subjected to orientation treatment in the same manner as in the array substrate is then formed.

The orientation of the liquid crystal molecules 517 in the liquid crystal layer 505 sandwiched between the TFT substrate 502 and the color filter substrate 504 is controlled by the oriented film 518 when no voltage is applied. As the oriented film 518, an organic film such as a polyimide film is typical. In order to control the orientation of the liquid crystal molecules 517 in approximately parallel to a substrate surface, the organic film is subjected to orientation treatment for giving orientation, such as rubbing treatment, irradiation with light such as ultraviolet rays, or ion irradiation. Therefore, the orientation state of the liquid crystal molecules 517 during application of no voltage depends greatly on the orientation treatment and the material of the oriented film.

Examples of parameters indicating the orientation state of the liquid crystal molecules 517 include anchoring energy, a pretilt angle, and the like. The anchoring energy is a measure that represents how the liquid crystal molecules 517 are bound to an interface (oriented film) while the pretilt angle PT is a measure that represents how the liquid crystal molecules 517 tilt with respect to a substrate plane (oriented film surface) as illustrated in FIG. 2. Since the liquid crystal molecules 517 are going to align in the same direction relative to each other, the tilt angle T of the liquid crystal molecules 517 in a bulk of the liquid crystal layer 505 during application of no voltage is in the state of being tilting from the substrate surface due to the pretilt angle PT.

The tilt angle T in the TN mode, the IPS mode, or the FFS mode is approximately parallel to a substrate. However, the pretilt angle PT depends on an orientation treatment condition such as rubbing, the alkyl side or main chain of polyimide used in the oriented film 518, burning temperature, and the like. Therefore, when a tilt angle T in a bulk of liquid crystal layer 505 is measured by a crystal rotation method, tilt is generally found to be at 1 to 10°.

In the FFS mode, increase in the tilt angle T of the liquid crystal molecules 517 results in increase in the black luminance of the liquid crystal display device in a horizontal or vertical direction or a diagonal direction and therefore results in decrease in the contrast of the liquid crystal display device. Therefore, it is necessary to design the tilt angle T of the liquid crystal molecules 517 in the FFS mode to be as low as near zero.

For controlling the tilt angle T, an orientation treatment condition such as rubbing is an important parameter, and a parameter such as the alkyl side or main chain of polyimide used in the oriented film 518 or burning temperature is found to have a great influence. Furthermore, when the tilt angle T approaches zero, the tilt angle T is determined by the main chain of polyimide.

Although it is easy to simply decrease only the tilt angle T, it is necessary for the oriented film 518 to satisfy various product characteristics. Examples of the characteristics required for the oriented film 518 are uniform orientation, durability against rubbing, abnormal orientation due to generated cutting scrap, the uniformity of the film thickness of the oriented film 518, electric characteristics such as visual persistence, and the like. Therefore, there has not been known any method for simultaneously satisfying the low tilt angle T and the characteristics in the oriented film 518 used in the FFS mode.

Then, Japanese Patent Laid-Open No. 2000-356786 (Patent Literature 1) discloses a method for disposing a conductor layer (electrode) on a substrate in an opposite side in a liquid crystal display device in an FFS mode. In the patent publication, there is described a technology in which liquid crystal molecules having a negative dielectric anisotropy are used, an electric field generated between a pixel electrode and a common electrode, which electric field contains many components perpendicular to the substrate, is generated, and the liquid crystal molecules are controlled to be driven in a plane horizontal to the substrate by a synthetic electric field obtained as a result of overlapping the electric field and an electric field generated between the pixel electrode and an electrode disposed on the opposite side substrate. Furthermore, there is described a technology in which an electrode disposed on the opposite side substrate has a constant potential.

In Japanese Patent Laid-Open No. 2001-091974 (Patent Literature 2), the potential of a signal line is changed depending on other display data, an unnecessary electric field is therefore applied between the signal line and a pixel electrode (or a common electrode) in the external side of a pixel, such an electric field controlling electrode as to cover the edge of the signal line is disposed on an opposed substrate in order to improve leakage of light due to the electric field, a voltage with an opposite sign is applied between the electric field controlling electrode and the signal line, and a perpendicular electric field is applied in order to put liquid crystal molecules in a direction perpendicular to the substrate in a region between the signal line and the pixel electrode (or the common electrode) in the external side of the pixel.

CITATION LIST

Non Patent Literature

[Non Patent Literature 1]
1999 SID International Symposium Digest of Technical Papers, "A Novel Wide-Viewing-angle Technology: Ultra-Trans View", (p. 202)
[Patent Literature 1]
Japanese Patent Laid-Open No. 2000-356786
[Patent Literature 2]
Japanese Patent Laid-Open No. 2001-091974

In the FFS mode described in 1999 SID International Symposium Digest of Technical Papers, "A Novel Wide-Viewing-angle Technology: Ultra-Trans View", (p. 202) (Non Patent Literature 1), the tilt angle of the liquid crystal layer depends on the pretilt angle of the oriented film and it is thus difficult to satisfy good product characteristics as well as the low tilt angle.

It is described that the opposite electrode disposed on the opposite substrate has a constant potential in the technology of Japanese Patent Laid-Open No. 2000-356786 (Patent Literature 1). Although it is necessary to increase the electric field perpendicular to the substrate in order to control the tilt angle of the liquid crystal molecules, the flicker display of the liquid crystal display device is deteriorated by the electric field.

In the technology of Japanese Patent Laid-Open No. 2001-091974 (Patent Literature 2), the liquid crystal molecules are put in the direction perpendicular to the substrate in the region between the signal line and the pixel electrode (or the common electrode) in the external side of the pixel, and the tilt angle of the liquid crystal layer in a region through which light passes in the pixel cannot be controlled.

An object of the present invention is to suppress increase in black luminance in a horizontal or vertical direction or a diagonal direction to improve contrast by realizing a low tilt angle without depending on an oriented film in an FFS mode.

An object of the present invention is to suppress the local unevenness of the orientation state of liquid crystal molecules occurring by orientation treatment of an oriented film to improve the uniformity of an image plane by uniformly generating a longitudinal electric field in an opening, through which light of the liquid crystal display panel passes, to control the orientation state of the liquid crystal molecules.

An object of the present invention is to allow a low tilt angle to be realized without depending on an oriented film even in a liquid crystal display panel in an FFS mode in antiparallel orientation in the state of applying no voltage or a liquid crystal display panel in an FFS mode in spray orientation, to realize longitudinally and laterally symmetrical viewing angle characteristics, and to obtain display with reduced diagonal black brightness.

An object of the present invention is to suppress a difference of a tilt angle, occurring depending on an orientation treatment process, such as orientation treatment with rubbing or an ion beam or orientation treatment with light irradiation, or a material, to provide a liquid crystal display panel having the same viewing angle characteristics without depending on an orientation treatment method.

SUMMARY OF THE INVENTION

In order to solve the above-described problem, the liquid crystal display device of the present invention includes a first electrode disposed on a substrate in planar form; a plurality of second electrodes which are each aligned in generally parallel to the first electrode and form a fringe electric field between the second electrodes and the first electrode; a third electrode disposed on an opposite substrate opposed to the substrate in planar form to face the first and second electrodes; liquid crystal with a negative dielectric anisotropy, disposed via an oriented layer between the first and second electrodes and the third electrode; and electric field controlling means which forms an alternating electric field between the first and second electrodes and the third electrode.

In the liquid crystal of the present invention, liquid crystal molecules are aligned by the oriented layer; and the liquid crystal molecules have a tilt angle of 1 to 10° with respect to a substrate surface.

In the liquid crystal display device of the present invention, the electric field controlling means which forms the alternating electric field includes one electrode having a constant potential and another electrode having a periodically changed potential.

Further, in the liquid crystal display device of the present invention, the electric field controlling means which forms the alternating electric field includes both electrodes having potentials that are periodically changed in a reverse direction to form the alternating electric field.

On the other hand, in the liquid crystal display device of the present invention, the oriented layer includes polyimide and is subjected to orientation treatment by a rubbing method.

Furthermore, in the liquid crystal display device of the present invention, the oriented layer may be subjected to orientation treatment by light irradiation or may be subjected to orientation treatment by irradiation with an ion beam.

The liquid crystal display device of the present invention is a liquid crystal display device in an FFS mode in which a color filter substrate and a TFT substrate which are opposed to each other are in antiparallel orientation.

In accordance with the present invention, increase in black luminance in a horizontal or vertical direction or a diagonal direction can be suppressed to improve contrast by realizing a low tilt angle without depending on an oriented film in an FFS mode.

In accordance with the present invention, the black luminance of a front face can be decreased in an FFS mode in antiparallel orientation by realizing a low tilt angle, to cancel asymmetrical viewing angle characteristics caused by a tilt angle direction.

In accordance with the present invention, in black display, not only the orientation of liquid crystal molecules is controlled by an oriented film but also the orientation state of liquid crystal molecules is controlled by a uniform longitudinal electric field. As a result, the local unevenness of the orientation state of the liquid crystal molecules, occurring due to, e.g., the orientation treatment of the oriented film, can be corrected to improve the uniformity of an image plane.

In accordance with the present invention, a low tilt angle can be realized even in a liquid crystal display panel in an FFS mode in antiparallel orientation in the state of applying no voltage or a liquid crystal display panel in an FFS mode in spray orientation, to realize longitudinally and laterally symmetrical viewing angle characteristics and to obtain display with reduced diagonal black brightness.

In accordance with the present invention, a difference of a tilt angle, occurring depending on an orientation treatment process, such as orientation treatment with rubbing or an ion beam or orientation treatment with light irradiation, or an oriented film material can be suppressed to provide a liquid crystal display panel having the same viewing angle characteristics without depending on an orientation treatment method.

DETAILED DESCRIPTION OF THE PREFERRED EMBODIMENTS

The liquid crystal display device according to each present embodiment will be explained below with reference to the drawings.

Example 1

Figure 1:
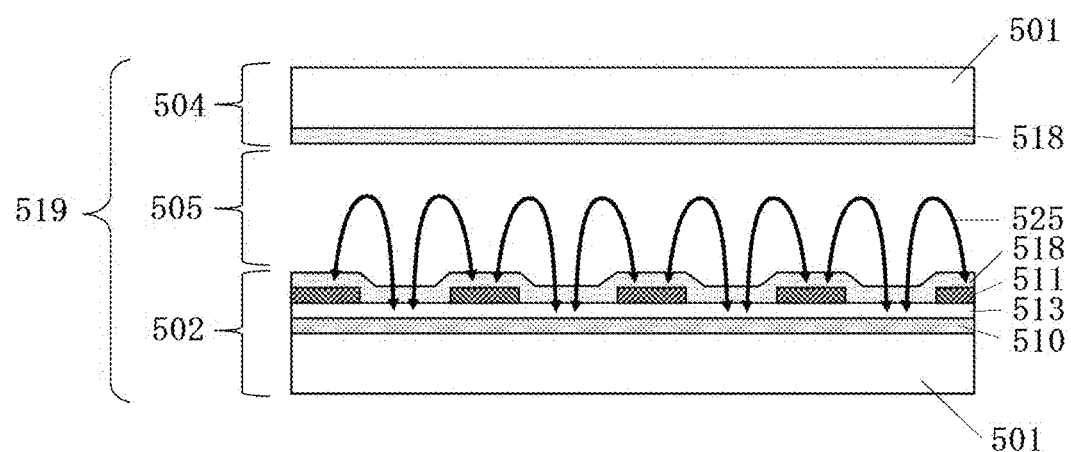
FIG. 1 is a cross-sectional view that illustrates the structure of a liquid crystal display panel in an FFS mode in the related art.
Figure 2:
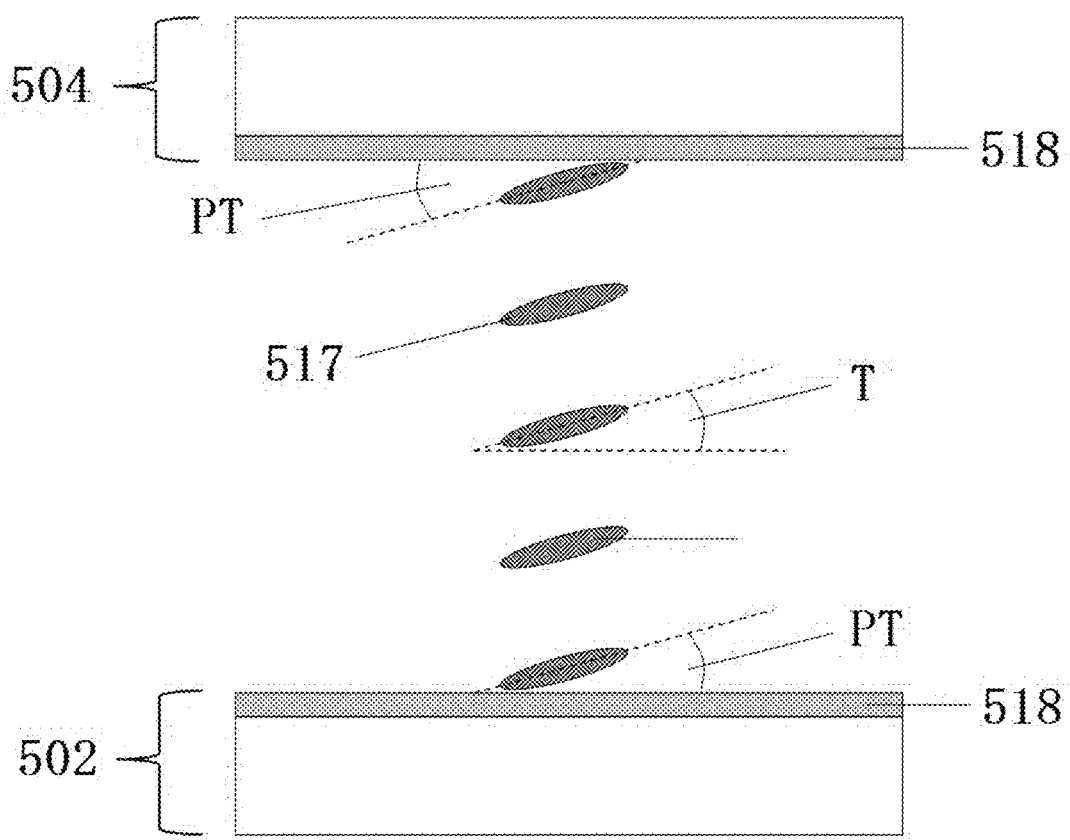
FIG. 2 is a view that illustrates the definitions of a pretilt angle and a tilt angle.
Figure 3:
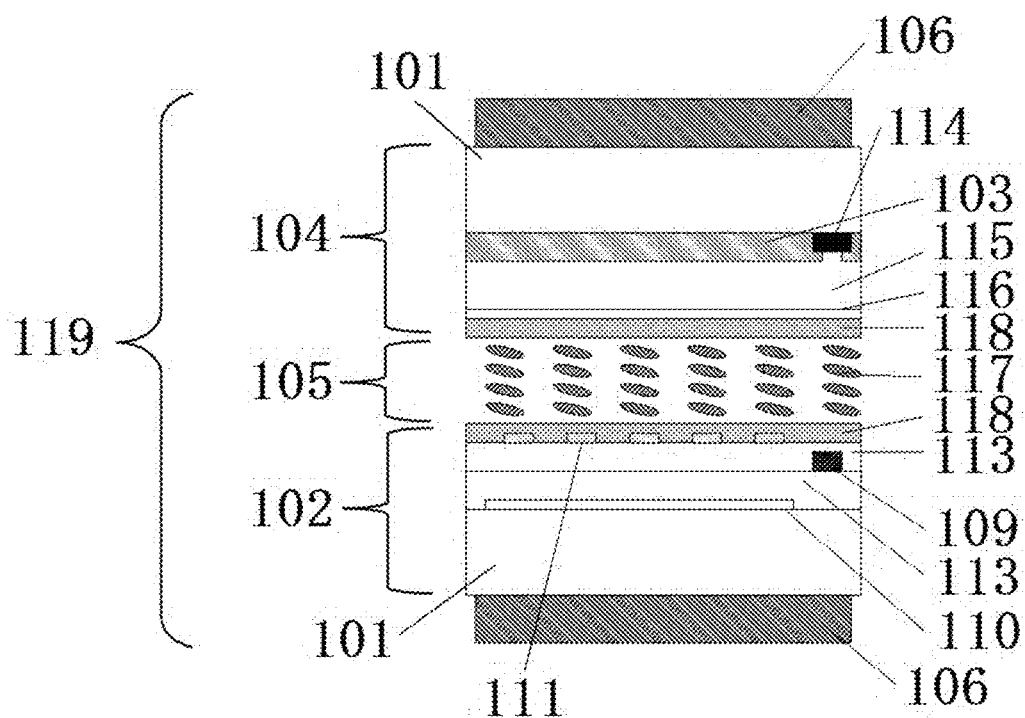
FIG. 3 is a cross-sectional view that illustrates a liquid crystal display device in Example 1 of the present invention.

As illustrated in FIG. 3, in the liquid crystal display device of the present embodiment, a TFT substrate 102 in which a transistor which is not illustrated is formed on a glass substrate 101 and a color filter substrate 104 in which a color layer 103 and the like are similarly formed on a glass substrate 101 are affixed to each other at a certain spacing, and a liquid crystal layer 105 is sealed between both substrates. Polarizing plates 106 are disposed on the external sides of the TFT substrate 102 and the color filter substrate 104.

Figure 4:
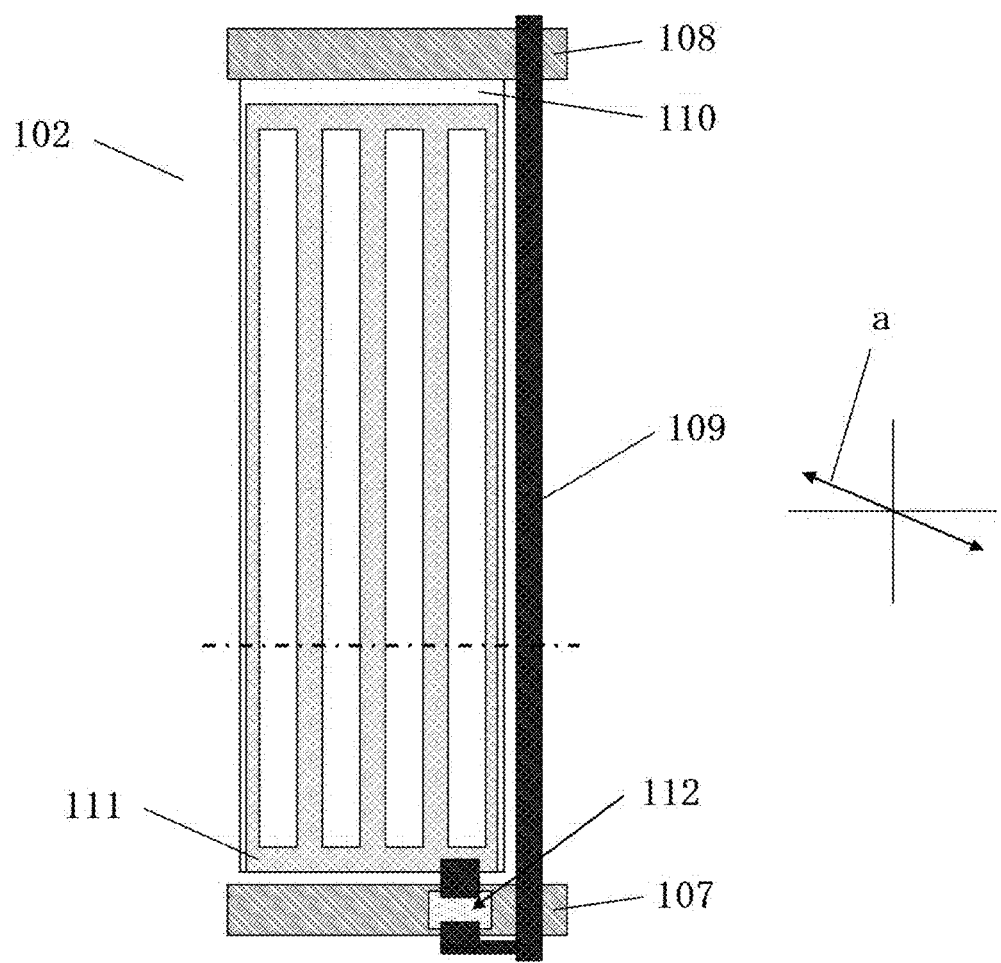
FIG. 4 is a plan view that illustrates the pixel of the liquid crystal display device in Example 1 of the present invention.

FIG. 4 illustrates the plan view of the pixel of the TFT substrate 102. On the TFT substrate 102 of the liquid crystal display device of the present embodiment, the wiring of gate lines 107, common electrode lines 108, and signal lines 109 is formed. As omitted in the drawing, the gate lines 107 are plural on the TFT substrate and are disposed to be parallel to each other. The common electrode lines 108 and the signal lines 109 are also similarly plural and are each disposed to be parallel to each other. In addition, the gate lines 107, the common electrode lines 108, and the signal lines 109 are extended to the periphery of the TFT substrate 102 and are each connected to an external power source for driving the liquid crystal display device.

A TFT side common electrode 110 is disposed in planar form on the TFT substrate and is electrically connected to the common electrode lines 108. A plurality of pixel electrodes 111 are present on the TFT substrate and are each connected to a thin film transistor 112 disposed at the intersection of the gate lines 107 and the signal lines 109. The TFT side common electrode 110 and the pixel electrodes 111 are laminated to sandwich an insulating film 113 and are not electrically connected. The pixel electrodes 111 disposed on a liquid crystal surface side are provided with openings to apply a fringe electric field due to a potential difference between the TFT side common electrode 110 and the pixel electrodes 111 to the liquid crystal layer 105.

In addition, the TFT side common electrode 110 and the pixel electrodes 111 are formed of transparent electrodes with ITO and the like, and light is intended to pass through the region.

In contrast, in the color filter substrate 104, as illustrated in FIG. 3, a black matrix 114 disposed for shielding a part of incident light and the color layer 103 through which light with any wavelengths such as red, green, or blue passes are laminated, a flattening film 115 which covers the black matrix 114 and the color layer 103 and includes acryl and the like is further laminated, and a CF side common electrode 116 including a transparent electrode with ITO and the like is then formed.

As illustrated in FIG. 3, oriented films 118 in which liquid crystal molecules 117 are subjected to horizontal orientation treatment and which include polyimide and the like are further formed on the liquid crystal surface sides of the TFT substrate 102 and the color filter substrate 104. The liquid crystal layer 105 which is subjected to parallel orientation by the oriented films 118 and has a negative dielectric anisotropy is formed between the TFT substrate 102 and the color filter substrate 104. As for the orientation direction a of the liquid crystal molecules 117, the angle θ between a fringe electric field direction and the orientation direction a of the liquid crystal molecules 117 may be 0°<θ<90° so that the liquid crystal molecules are rotated by a fringe electric field.

The oriented films 118 are subjected to various methods, of which examples include rubbing treatment in which an organic film including polyimide or polyamic acid is rubbed using a rubbing fabric such as rayon or cotton. The oriented films 118 are subjected to, other than the methods, irradiation of an organic film such as polyimide or an inorganic film such as diamond carbon with an ion beam from the angle direction of a tilt with respect to the substrate surface, irradiation of a material, which is decomposed, reacted, or deformed by absorbing light, with light from the angle direction of a tilt with respect to the substrate surface, and the like, without limitation to the rubbing method.

The orientation state of the liquid crystal molecules 117 in the liquid crystal layer 105 is controlled in antiparallel or spray orientation by the oriented films 118. In the case of the antiparallel orientation, the tilt angles of the liquid crystal molecules 117 are 1 to 10° with respect to the substrate surface due to the pretilt angles of the top and bottom substrates. In contrast, in the case of the spray orientation, the pretilt angles of the top and bottom substrates are opposite directions and the tilt angles therefore become about 0° without depending on the pretilt angles. Accordingly, the tilts of the liquid crystal molecules with respect to the substrate surface are relatively greater in the antiparallel orientation than in the spray orientation and the effect of canceling asymmetrical viewing angle characteristics caused by a tilt angle direction is therefore greater in the antiparallel orientation. However, in the spray orientation, there is also the effect of suppressing increase in black luminance in a diagonal direction since liquid crystal molecules in the vicinity of the substrate tilt due to a pretilt angle.

In such a manner, a liquid crystal display panel 119 in the liquid crystal display device according to the present embodiment can be obtained.

Furthermore, the CF side common electrode 116 may be provided with electric field controlling means for forming an alternating electric field to a potential of the TFT side common electrode 110 and with another driving device required for liquid crystal display to obtain the liquid crystal display device. The alternating electric field as used herein refers to an electric field in which the polarity of the applied electric field is periodically reversed. The CF side common electrode 116 may be electrically connected to any wiring of the TFT substrate 102 to control a potential from the outside via the wiring, for example, as in the case of a liquid crystal display device of a TN mode, or a potential may be controlled by direct connection to the CF side common electrode 116. Other configurations which are not described are similar to those in the related art.

Figure 5:
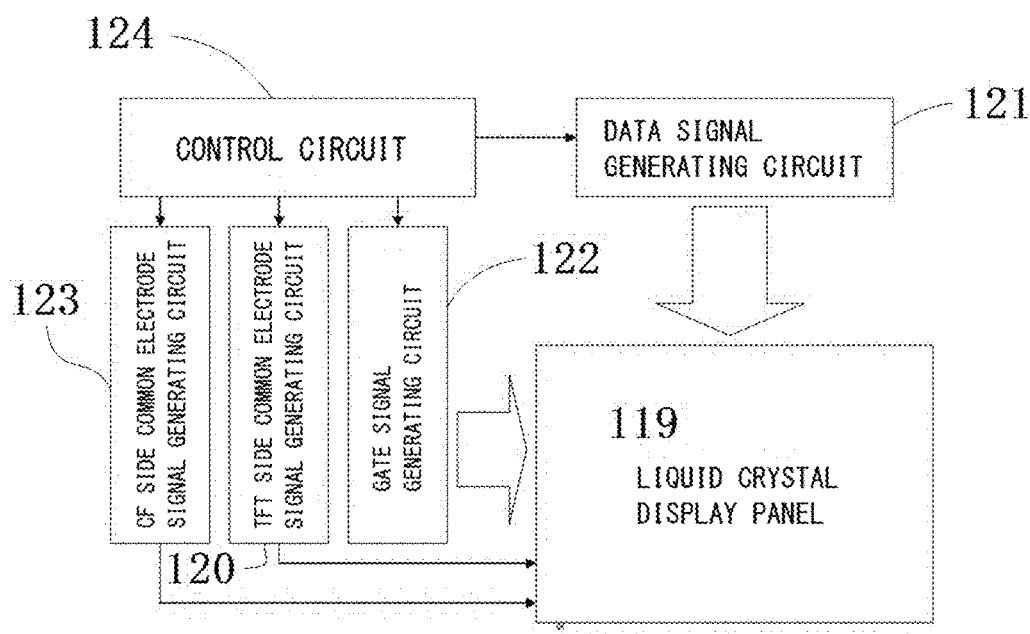
FIG. 5 is a configuration view of a block circuit for driving the liquid crystal display device in Example 1 of the present invention.

FIG. 5 is a configuration view of a block circuit for driving the liquid crystal display device according to the present embodiment. The block circuit is configured by: a first signal generating circuit for generating the TFT side common electrode signal (hereinafter referred to as TFT side common electrode signal generating circuit 120); a second signal generating circuit for generating a potential corresponding to image data to the potential of the TFT side common electrode 110 (hereinafter referred to as data signal generating circuit 121); a third signal generating circuit for generating a gate signal which turns TFT on (hereinafter referred to as gate signal generating circuit 122); a fourth signal generating circuit for generating a potential of the CF side common electrode 116 to form an alternating electric field to the potential of the TFT side common electrode 110 (hereinafter referred to as CF side common electrode signal generating circuit 123); and a control circuit 124 for controlling the circuits.

The operation of the liquid crystal display panel 119 according to the present embodiment will now be explained with reference to FIGS. 6 to 8. FIG. 6 indicates the potential of each electrode for driving the liquid crystal display panel 119 according to the present embodiment.

Figure 6A:
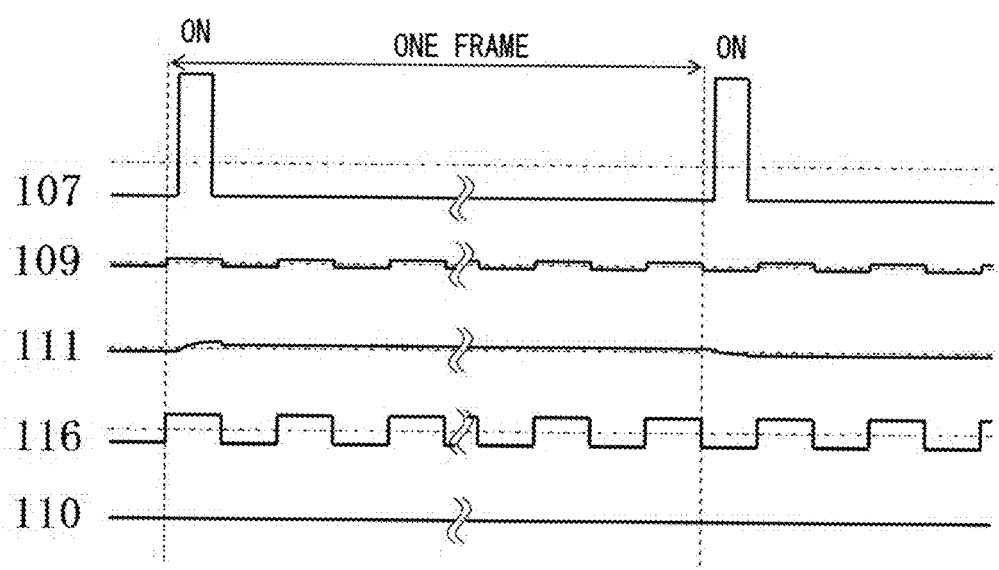
FIG. 6(A) is a view that indicates the potential of each electrode during displaying black in the liquid crystal display device in Example 1 of the present invention.

FIG. 6(A) indicates the potential of each electrode during displaying black. A positive pulse is applied to the gate lines to be in the state of turning TFT on and the potential of the signal lines 109 connected to TFT at this time is written in the pixel electrodes 111. Since the potential of the TFT side common electrode 110 is always fixed at a constant level and the difference between the potential of the pixel electrodes 111 and the potential of the TFT side common electrode 110 is set to be zero or a very small potential difference during displaying black, a fringe electric field between the pixel electrodes 111 and the TFT side common electrode 110 is hardly generated. Therefore, the liquid crystal molecules are not rotated.

Meanwhile, the CF side common electrode 116 is connected to an external circuit for forming an alternating electric field between the CF side common electrode 116 and the TFT side common electrode 110. In contrast to the potential of the TFT side common electrode 110, which is fixed at a constant level, the potential of the CF side common electrode 116 is changed to periodically reverse the polarity of the electric field.

In general, liquid crystal used in a liquid crystal display is dielectrically dispersed. In the case of a frequency of higher than 10 kHz, the electric field response of the liquid crystal does not gradually occur. Therefore, it is desirable to reverse the potential of the CF side common electrode 116 at a frequency of 10 kHz or less. Further, the frequency becomes low, the liquid crystal molecules 117 are rotated to follow the potential reversion of the CF side common electrode 116. Since the rotation of the liquid crystal molecules 117 results in observation as a flicker, a frequency of 60 Hz or more, which is not less than the frequency response of the human eye, is preferred.

Figure 7:
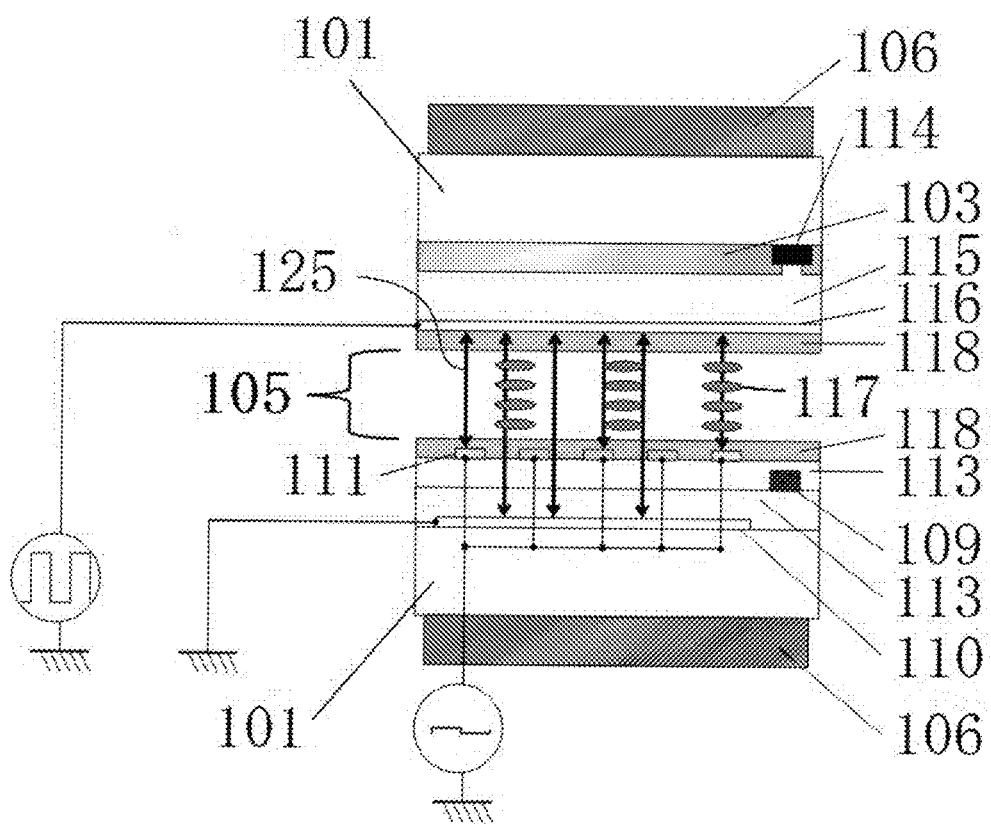
FIG. 7 is a view that gives an explanation about operation during displaying black in the liquid crystal display device in Example 1 of the present invention.
Figure 8A:
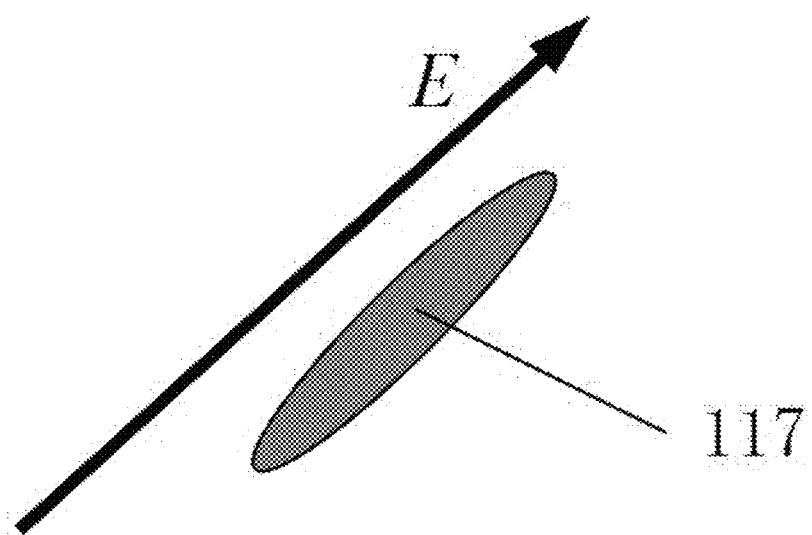
FIG. 8(A) is a view that gives an explanation about the dielectric anisotropy of liquid crystal and an alignment direction to an electric field (in the case of liquid crystal molecules with $\Delta\epsilon > 0$)
Figure 8B:
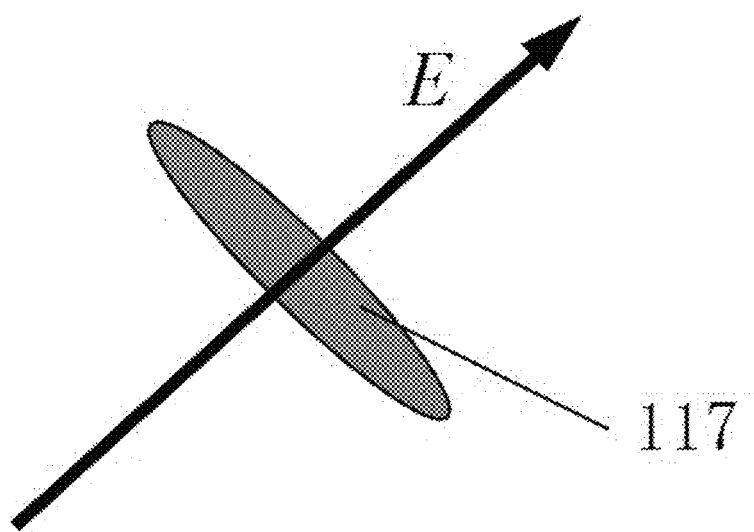
FIG. 8(B) is a view that gives an explanation about the dielectric anisotropy of liquid crystal and an alignment direction to an electric field (in the case of liquid crystal molecules with $\Delta\epsilon < 0$)

FIG. 7 illustrates an image during the driving. An external circuit, in which a potential is changed at a frequency of 10 kHz or less, is connected to the CF side common electrode 116. The TFT side common electrode 110 in the TFT substrate 102 is held at a constant potential and a potential similar to the potential of the TFT side common electrode 110 is written in the pixel electrodes 111. A longitudinal electric field perpendicular to the substrate surface is applied to the liquid crystal layer 105 sandwiched between the CF side common electrode 116 and the TFT side common electrode 110 and the pixel electrodes 111 having similar potentials.

A difference between the cases of the positive and negative dielectric anisotropies of liquid crystal results from the different directions of aligning liquid crystal molecules with respect to an electric field. As illustrated in FIG. 8, the liquid crystal molecules 117 which are long and narrow are rotated and aligned to be parallel to an electric field direction when the dielectric anisotropy is positive, while the liquid crystal molecules 117 are aligned to be perpendicular to the electric field direction when the dielectric anisotropy is negative.

Accordingly, a force on the liquid crystal molecules 117 is exerted to be aligned in parallel to the substrate when an electric field 125 illustrated in FIG. 7 is applied. In this case, the angle at which the liquid crystal molecules 117 are rotated depends on an applied voltage.

Figure 9:
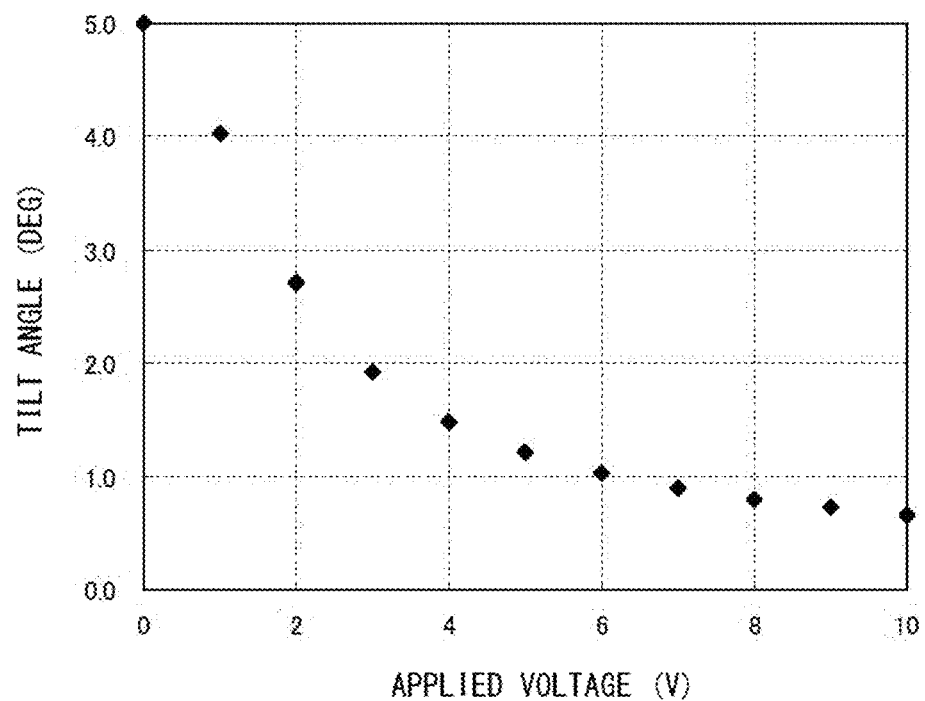
FIG. 9 is a view that indicates a relationship between an applied voltage in a CF side common electrode in Example 1 of the present invention and a tilt angle.

FIG. 9 indicates a the relationship between a voltage in the CF side common electrode 116 according to the present invention and a tilt angle in the liquid crystal layer 105 when a voltage is applied. The tilt angle was measured using a crystal rotation method. The tilt angle in the case of an applied voltage of zero corresponds to the pretilt angle of the liquid crystal molecules 117, generated by the oriented films 118. The pretilt angle of a general oriented film is from 1° to 10° and the oriented films 118 of 5° are used in this case.

When the applied voltage becomes high, the liquid crystal molecules 117 are rotated to be oriented perpendicularly with respect to the electric field 125 and, therefore, the tilt angle gradually approaches zero from the tilt angle equal to the pretilt angle generated by the oriented films 118 as indicated in FIG. 9. In such a manner, the tilt angle can be adjusted by electric field strength between the CF side common electrode 116 and the TFT side common electrode 110.

Further, it is found that a potential difference of several volts is necessary for controlling the tilt angle by the electric field 125 between the CF side common electrode 116 and the TFT side common electrode 110. When the polarity of the electric field is not reversed in a potential difference between the CF side common electrode 116 and the TFT side common electrode 110, i.e., when a certain potential difference is generated, electric current flows through the liquid crystal layer 105, and life is shortened by occurrence of a liquid crystal sticking phenomenon and the like. Therefore, the electric field 125 between the CF side common electrode 116 and the TFT side common electrode 110 forms an alternating electric field which reverses polarity.

As a result, in accordance with the present invention, the oriented films 118 even having the high pretilt angle can be used with the tilt angle reduced by the alternating electric field although an oriented film that reduces a pretilt angle has been needed in the conventional FFS mode. For example, even when an oriented film 118 for a TN mode having a high pretilt angle to a certain extent is used in the liquid crystal display device of the present invention, the oriented film with a reduced tilt angle can be used. As a result, the need for switching an oriented film material during producing the liquid crystal display panel is eliminated and production efficiency can be therefore increased.

Based on the above, the tilt angle of the liquid crystal can be made to be lower than the pretilt angle caused by the oriented films 118 in the state of displaying black in the liquid crystal display panel according to the present embodiment.

Figure 6B:
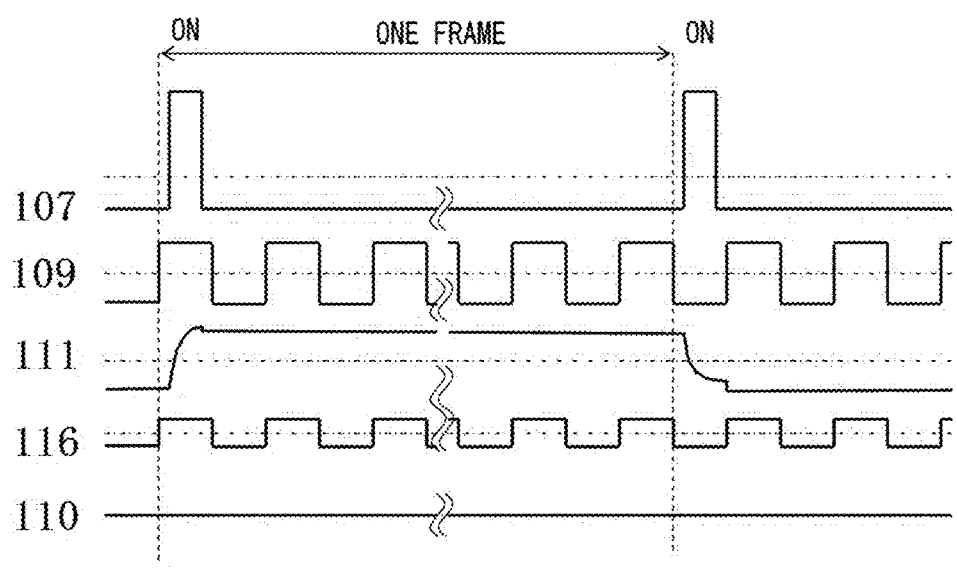
FIG. 6(B) is a view that indicates the potential of each electrode during displaying white in the liquid crystal display device in Example 1 of the present invention.

The state of displaying white will now be explained with reference to FIG. 6(B). A voltage with a large voltage magnitude is applied to the signal lines 109. As in the case of displaying black, a pulsed voltage is applied to the gate lines 107 to be in the state of turning TFT on, and the potential of the signal line 107 connected at this time is written in the pixel electrodes 111. The potential of the TFT side common electrode 110 is always fixed at a constant level, and a fringe electric field is generated by the potential difference between the pixel electrodes 111 and the TFT side common electrode 110.

Figure 10:
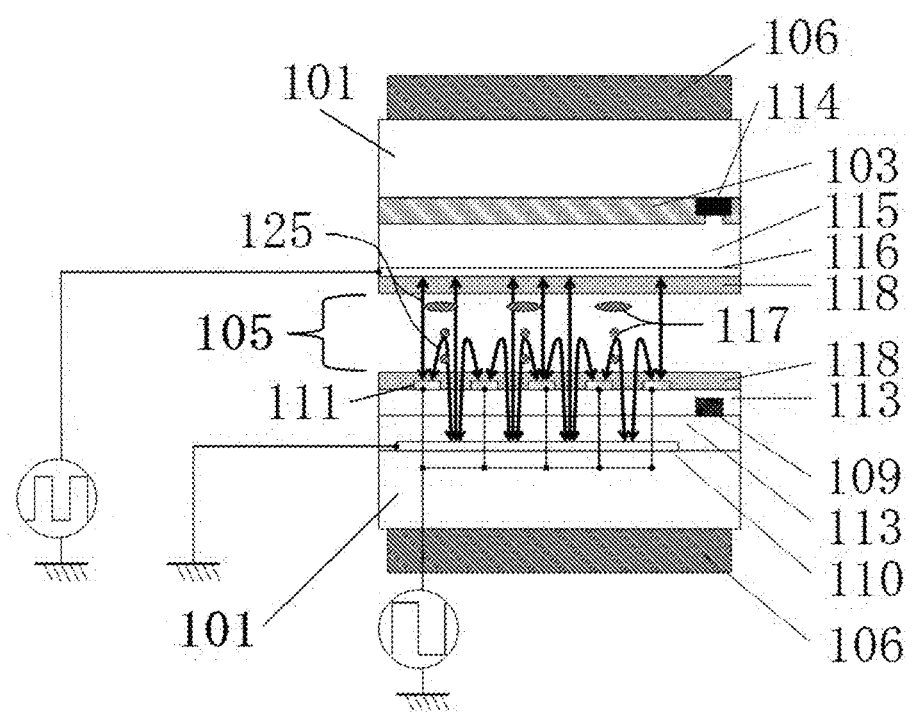
FIG. 10 is a view that gives an explanation about the operation of displaying white in the liquid crystal display device in Example 1 of the present invention.

The liquid crystal molecules 117 oriented in any direction by an orientation treatment method such as a rubbing method originally in the state of applying no voltage are simultaneously rotated in the substrate surface so as to be realigned perpendicularly with respect to the direction of the fringe electric field between the pixel electrodes 111 and the TFT side common electrode 110 as illustrated in FIG. 10. Simultaneously, the alternating electric field is always applied to the CF side common electrode 116 and the TFT side common electrode 110, and a complicated electric field is therefore applied to the liquid crystal layer 105.

Figure 11:
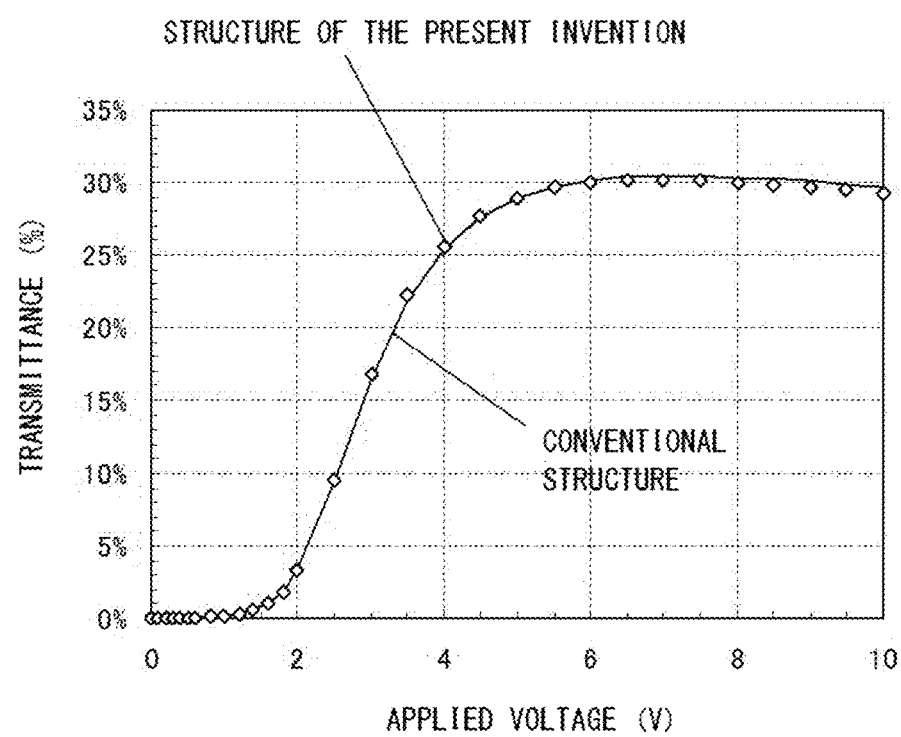
FIG. 11 indicates the voltage-transmittance characteristics of the liquid crystal display device in Example 1 of the present invention.

FIG. 11 is a voltage-transmittance graph of the case of a potential difference of 2 V between the CF side common electrode 116 and the TFT side common electrode 110 to apply an alternating electric field and of the conventional structure. The voltage-transmittance characteristics according to the present invention, in which the alternating electric field is applied between the CF side common electrode 116 and the TFT side common electrode 110, are the same as the voltage-transmittance characteristics in the conventional structure. Based on the result, even when the alternating electric field is applied using the CF side common electrode 116, the orientation state of the liquid crystal is similar to that in the conventional structure, and light and shade can be controlled by a potential difference between the pixel electrodes 111 and the TFT side common electrode 110.

When a liquid crystal display panel in an FFS mode is produced using an oriented film with a high pretilt angle, a user has a sense of incongruity in observation from a front with each varying visual field since viewing angle characteristics are asymmetrical in parallel orientation, while light leaks due to the high pretilt angle and contrast looks to be low in spray orientation.

However, in the liquid crystal display panel of the present invention, the pretilt angle of the oriented films 118 is controlled by applying the voltage of the CF common electrode 116 and, therefore, the tilt angle is lower than the original pretilt angle of the oriented films 118 during displaying black to result in low leak light and display with symmetrical viewing angle characteristics. Further, the tilt angles of the liquid crystal molecules 117, which have been different until now due to production by using another oriented film material and by using a different orientation treatment method, can be similarly controlled in accordance with the present invention, a difference in the outward appearances of products is eliminated, and a product with stable display characteristics can be provided.

Furthermore, an oriented film material which has been excellent in visual persistence characteristics and orientation characteristics but has not been able to be used because of having an excessively high pretilt angle until now can also be applied to an FFS liquid crystal display device, the number of the options of the oriented film material can be increased, and material design devoted to characteristics other than a pretilt angle is therefore enabled.

The liquid crystal display panel of the present invention also inhibits exteriorization of unevenness due to a difference in pretilt angles, occurring in an image plane. For example, the tilt angle in a bulk of the liquid crystal layer 105 varies to cause unevenness due to a pretilt angle partially varying in, e.g., a section where the thickness of a rubbing fabric locally varies in the rubbing method, while a difference in the pretilt angles can be reduced by the electric field in the lengthwise direction of the liquid crystal display panel of the present invention. Therefore, display image quality with high uniformity is obtained in the liquid crystal display panel of the present invention. Effects similar to those in this case are also obtained in an ion beam method or other orientation treatment methods Example 2

Figure 12:
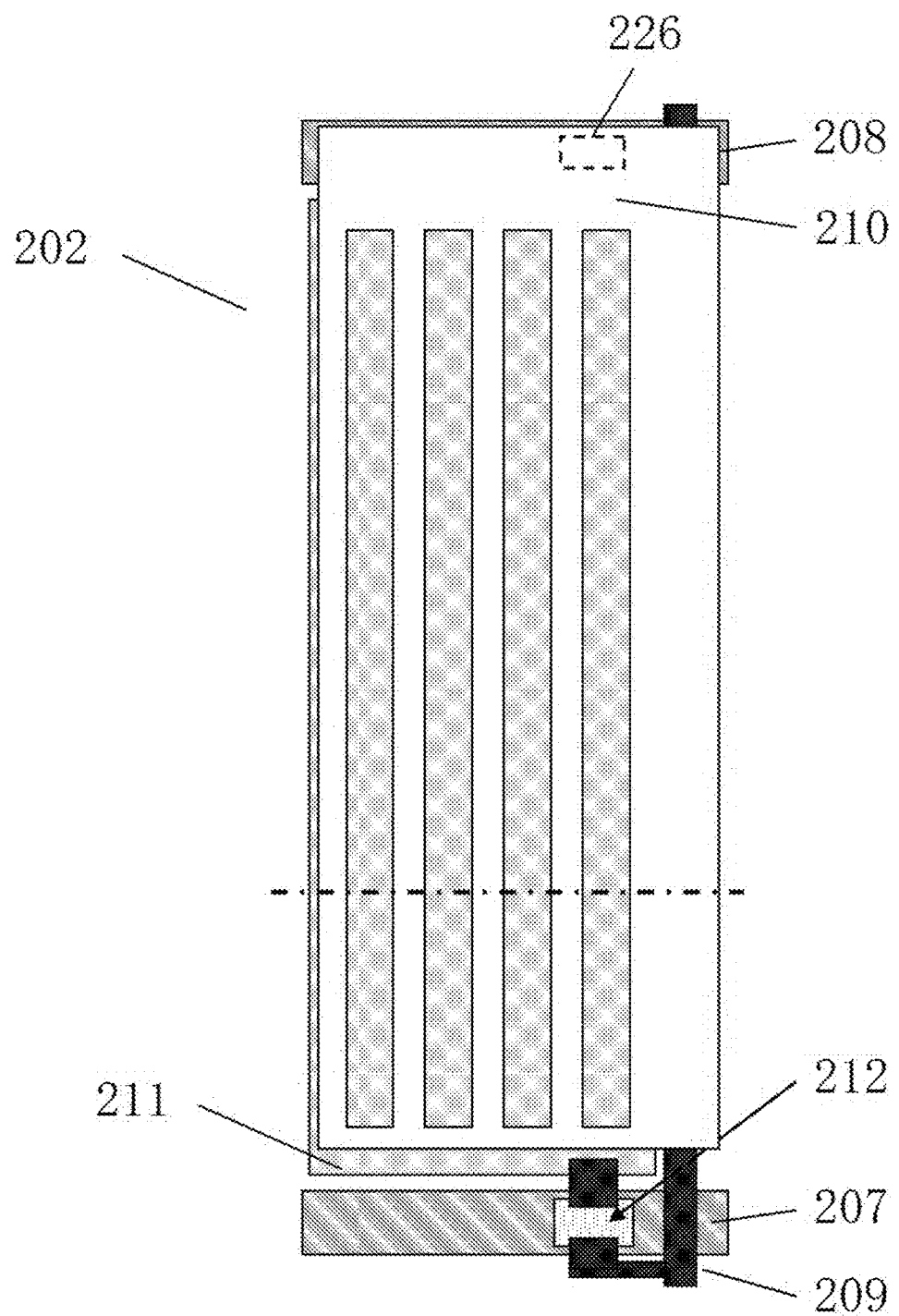
FIG. 12 is a plan view that illustrates the pixel of a liquid crystal display device in Example 2 of the present invention.
Figure 13:
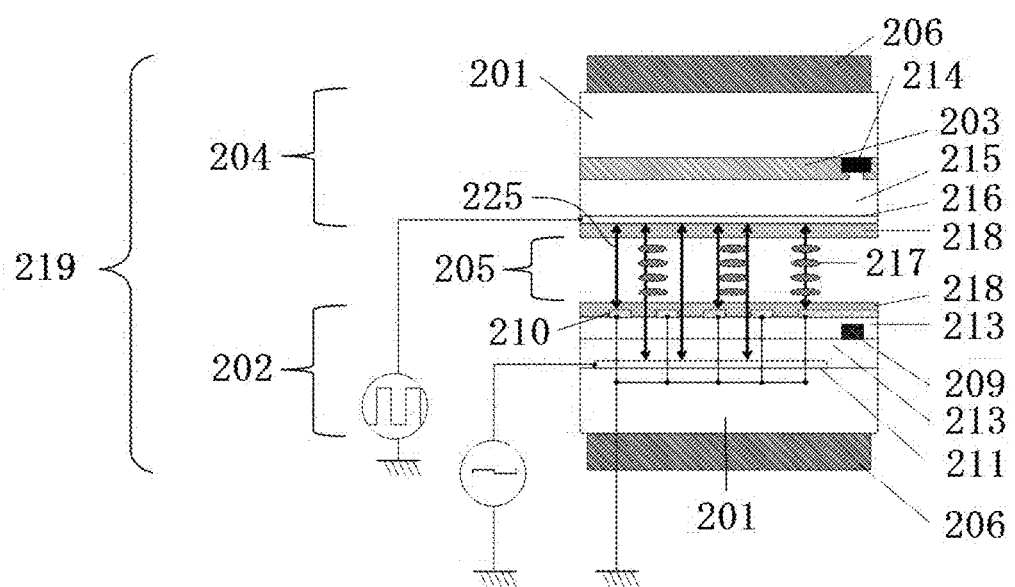
FIG. 13 is a view that gives an explanation about operation in display of black in the liquid crystal display device in Example 2 of the present invention.

FIG. 12 illustrates a plan view of the pixel of a liquid crystal display device in accordance with Example 2 of the present invention. FIG. 13 is a cross-sectional view that illustrates operation in display of black in the liquid crystal display device in accordance with Example 2 of the present invention.

On a TFT substrate 202 of the liquid crystal display device of Example 2 of the present invention, the wiring of gate lines 207, common electrode lines 208, and signal lines 209 is formed as in the case of the liquid crystal display device of Example 1. As omitted in the drawing, the gate lines 207 are plural on the TFT substrate and are disposed to be parallel to each other. The common electrode lines 208 and the signal lines 209 are also similarly plural and are each disposed to be parallel to each other. In addition, the gate lines 207, the common electrode lines 208, and the signal lines 209 are extended to the periphery of the TFT substrate 202 and are each connected to an external power source for driving the liquid crystal display device.

Pixel electrodes 211 of the liquid crystal display device of Example 2 of the present invention are connected to a thin film transistor 212 disposed at the intersection of the gate lines 207 and the signal lines 209. A TFT side common electrode 210 is laminated on the pixel electrodes to sandwich an insulating film 213 and is connected to the common electrode lines 208 through a contact hole 226.

The TFT side common electrode 210 disposed in a liquid crystal surface side is provided with openings in order to generate a fringe electric field with the pixel electrodes 211. The TFT side common electrode 210 can be disposed on the wiring of the gate lines 207, the signal lines 209, or the like, which has a different potential, by being disposed on the upper layer in such a manner.

The other configurations are same as those in Example 1. Accordingly, the same configuration in the present example as that in Example 1 is marked with a reference numeral of which the last two figures are the same as those in Example 1.

The operation of the liquid crystal display device in accordance with Example 2 of the present invention during displaying black will now be explained. A potential that is approximately equal to the potential of the TFT side common electrode 210 is written in the pixel electrodes 211 disposed in the lower layer of the TFT substrate 202 via the thin film transistor 212. Meanwhile, the TFT common electrode 210 disposed on the upper layer is held at a constant potential. As a result, there is no potential difference between the pixel electrodes 211 and the TFT side common electrode 210, and a fringe electric field that rotates liquid crystal molecules 217 in the direction of the inside of a substrate surface is not generated. A potential of which the electric field polarity is periodically reversed is applied from electric field controlling means for forming an alternating electric field between a CF side common electrode 216 and the TFT side common electrode 210.

The TFT side common electrode 210 can be disposed between the signal lines 209 or the gate lines 207 and the liquid crystal layer 205 by placing the TFT side common electrode 210 in a layer closer to a liquid crystal layer 205 in comparison with the liquid crystal display device of Example 1. Although the potentials of the signal lines 209 and the gate lines 207 always fluctuate as indicated in FIG. 6, electric fields from the signal lines 209 and the gate lines 207 can be shielded by disposing the TFT side common electrode 210. As a result, an electric field 225 perpendicular to approximately the whole substrate can be applied between the pixel electrodes 211 and the TFT side common electrode 210 and the CF side common electrode 216.

The effect of the present example 2 is to shield the surplus electric field of the TFT substrate 202 to apply the perpendicular electric field 225 which is approximately ideal. Therefore, the effect of Example 1 is promoted, viewing angle characteristics become further symmetrical, black luminance in a horizontal or vertical direction or a diagonal direction can be further reduced, and the contrast of an image plane can be further increased.

Example 3

A liquid crystal display device according to Example 3 of the present invention is a variation for driving of the liquid crystal display device according to Example 1 of the present invention and has different electric field controlling means for forming an alternating electric field from that of the liquid crystal display device according to Example 1.

In addition, the same configuration in the present example as that in Example 1 is also marked with a reference numeral of which the last two figures are the same as those in Example 1.

Figure 14A:
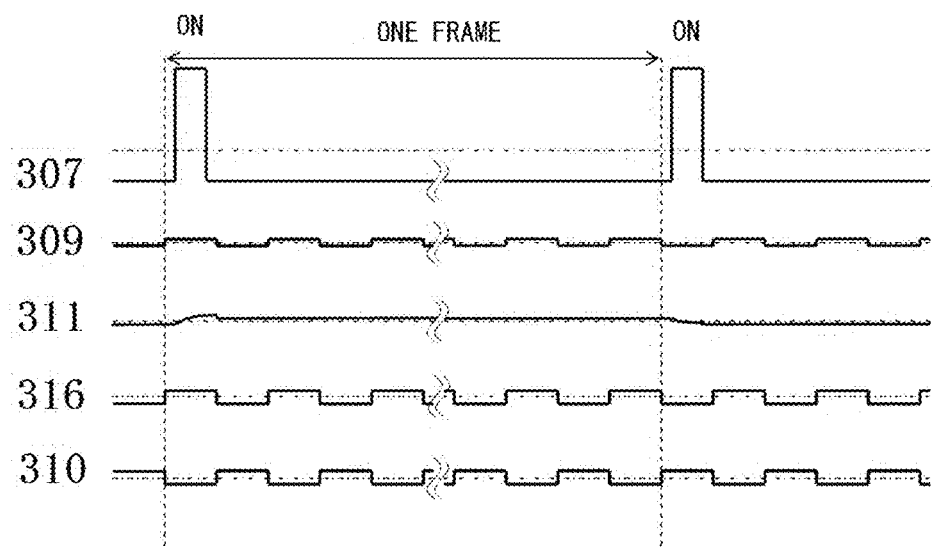
FIG. 14(A) is a view that indicates the potential of each electrode during displaying black in a liquid crystal display device in Example 3 of the present invention.
Figure 14B:
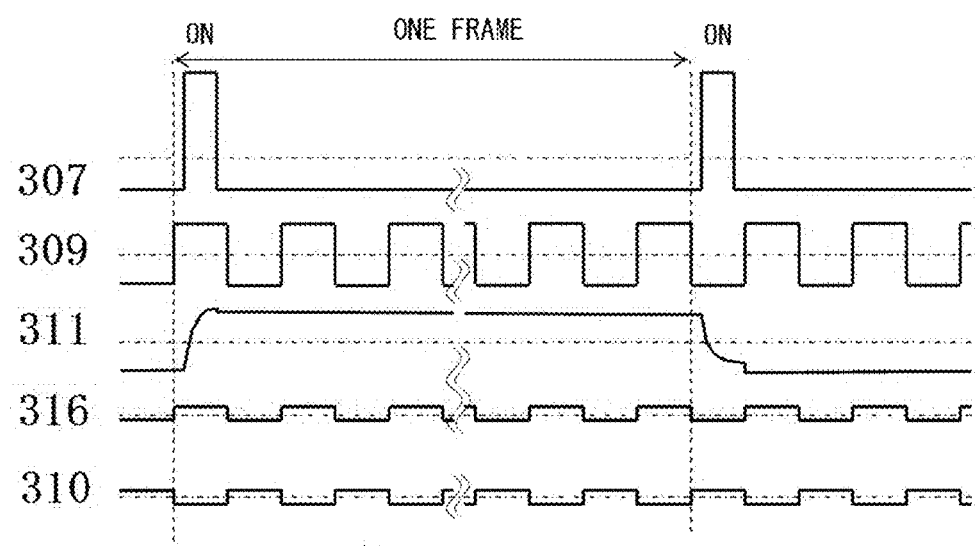
FIG. 14(B) is a view that indicates the potential of each electrode during displaying white in the liquid crystal display device in Example 3 of the present invention.

FIG. 14 indicates each electrode potential of the liquid crystal display device according to the present example 3. In Example 3, an alternating electric field is formed by periodically changing the potentials of a CF side common electrode 316 and a TFT side common electrode 310 in a reverse direction.

In Example 3 of the present invention, each amplitude width of electric field controlling means connected to the CF side common electrode 316 and the TFT side common electrode 310 can be reduced by one-half. Therefore, requirements for a driving circuit can be reduced.

In the present example, effects similar to those in the structure of Example 2 are also obtained.

Example 4

A liquid crystal display device according to Example 4 of the present invention is a variation for driving of the liquid crystal display device according to Example 1 of the present invention. Accordingly, the same configuration in the present example as that in Example 1 is also marked with a reference numeral of which the last two figures are the same as those in Example 1.

Figure 15:
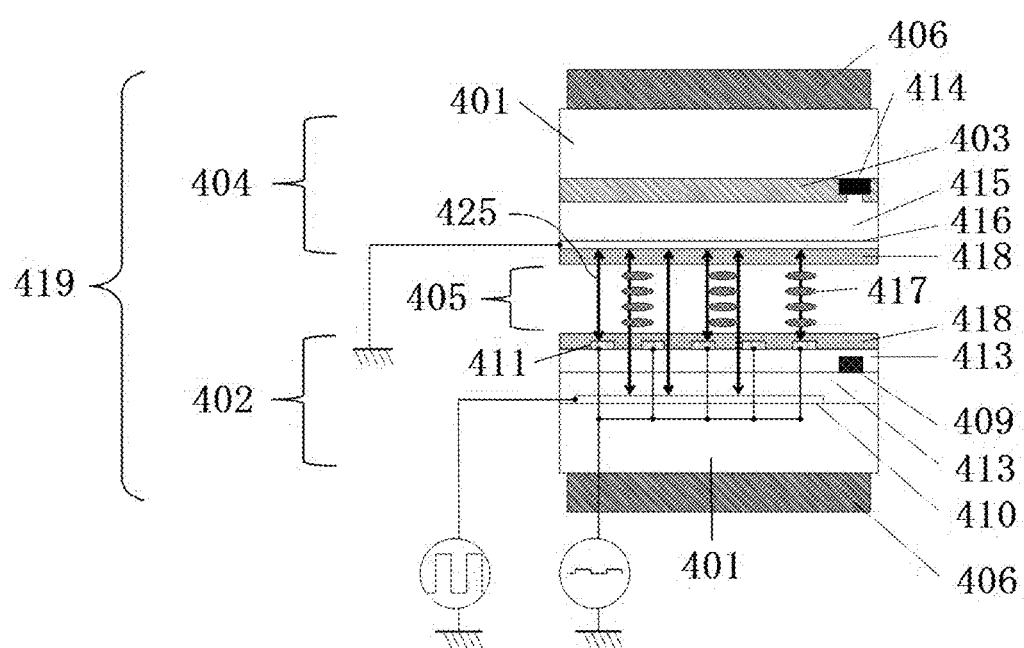
FIG. 15 is a view that gives an explanation about operation in display of black in a liquid crystal display device in Example 4 of the present invention.

FIG. 15 illustrates operation in display of black in Example 4 of the present invention. A method of applying an alternating electric field to the substrate of a liquid crystal layer 405 in a liquid crystal display panel is a method of fixing the potential of a CF side common electrode 416 and periodically reversing the potential of a TFT side common electrode 410. The other configurations are the same as those in Example 1.

An effect will now be explained. In the present example 4, the effect equivalent to that in Example 1 is obtained, and the potential of a color filter substrate 404 in an observer side is kept at a constant level. Therefore, noise to a very sensitive electronic instrument disposed in a color filter substrate side, such as a touch panel, can be suppressed.

In the present example, effects similar to those in the structure of Example 2 are also obtained.

DESCRIPTION OF SYMBOLS 101, 201, 401, 501 Glass substrate
102, 202, 402, 502 TFT substrate
103, 203, 403 Color layer
104, 204, 404, 504 Color filter substrate
105, 205, 405, 505 Liquid crystal layer
106, 206, 406 Polarizing plate
107, 207, 307 Gate line
108, 208 Common electrode line 109, 209, 309, 409 Signal line
110, 210, 310, 410, 510 TFT common electrode
111, 211, 311, 411, 511 Pixel electrodes
112, 212 Thin film transistors
113, 213, 413, 513 Insulating film
114, 214, 414 Black matrix
115, 215, 415 Flattening film
116, 216, 316, 416 CF side common electrode
117, 217, 417, 517 Liquid crystal molecules
118, 218, 418, 518 Oriented film
119, 219, 419, 519 Liquid crystal display panel
120 TFT side common electrode signal generating circuit
121 Data signal generating circuit
122 Gate signal generating circuit
123 CF side common electrode signal generating circuit
124 Control circuit
125, 225, 425, 525 Electric field
226 Contact hole
PT Pretilt angle
T Tilt angle
a Orientation direction of liquid crystal molecules

What is claimed is:

1. A liquid crystal display device comprising:
a first electrode disposed on a substrate in planar form;
a plurality of second electrodes which sandwich an insulating film in the first electrode, are each aligned in generally parallel to the first electrode, and form a fringe electric field between the second electrodes and the first electrode;
a third electrode disposed on an opposite substrate opposed to the substrate in planar form to face the first and second electrodes; and
liquid crystal with a negative dielectric anisotropy, disposed between an oriented layer on the substrate which dispose the first and second electrodes, and an another oriented layer on the opposite substrate which dispose the third electrode;
wherein the third electrode is connected to an electric field controlling means for forming an alternating electric field between the third electrode and the first and second electrodes.

2. The liquid crystal display device according to claim 1, wherein, in the liquid crystal, liquid crystal molecules are aligned by the oriented layer; and the liquid crystal molecules have a tilt angle of 1 to 10° with respect to a substrate surface.

3. The liquid crystal display device according to claim 2, wherein the liquid crystal molecules are in an orientation state of antiparallel orientation by the oriented layer.

4. The liquid crystal display device according to claim 1, wherein the electric field controlling means which forms the alternating electric field comprises one electrode having a constant potential and another electrode having a periodically changed potential.

5. The liquid crystal display device according to claim 1, wherein the electric field controlling means which forms the alternating electric field comprises both electrodes having potentials that are periodically changed in a reverse direction to form the alternating electric field.

6. The liquid crystal display device according to claim 1, wherein the oriented layer comprises polyimide and is subjected to orientation treatment by a rubbing method.

7. The liquid crystal display device according to claim 1, wherein the oriented layer is subjected to orientation treatment by light irradiation.

8. The liquid crystal display device according to claim 1, wherein the oriented layer is subjected to orientation treatment by irradiation with an ion beam.

* * * * *